United States Patent [19]

Buse

[11] Patent Number: 5,144,102
[45] Date of Patent: Sep. 1, 1992

[54] FLUID PRESSURE SWITCH ADAPTED FOR LOW FLUID PRESSURE AND THROUGHPUTS

[75] Inventor: Werner Buse, Kaarst, Fed. Rep. of Germany

[73] Assignee: Pierburg GmbH, Neuss, Fed. Rep. of Germany

[21] Appl. No.: 759,503

[22] Filed: Sep. 13, 1991

[30] Foreign Application Priority Data

Sep. 15, 1990 [DE] Fed. Rep. of Germany ... 9013153[U]

[51] Int. Cl.⁵ .............................................. H01H 35/34
[52] U.S. Cl. ................................ 200/83 Q; 73/861.47; 137/554; 137/557; 200/81.9 R; 200/302.1
[58] Field of Search .................. 137/510, 624.14, 554, 137/557; 200/81 R, 81.9 R, 83 B, 83 R, 83 Q, 83 S, 83 A, 83 W, 302.1; 307/118; 340/606, 611, 626; 73/723, 861.47

[56] References Cited

U.S. PATENT DOCUMENTS

| | | | |
|---|---|---|---|
| 3,321,594 | 1/1965 | Reise et al. | 200/83 R |
| 3,433,910 | 7/1966 | Pravda | 200/83 R |
| 4,266,697 | 5/1981 | Zissimopoulos | 222/450 |
| 4,357,748 | 11/1982 | Branson et al. | 200/83 Q |
| 4,365,124 | 12/1982 | Robinson | 200/83 Q |
| 4,443,671 | 4/1984 | Hinds | 200/81 R |
| 4,620,073 | 10/1986 | Yokota et al. | 200/83 Q |
| 4,914,264 | 4/1990 | Everett | 200/83 S |
| 5,076,322 | 12/1991 | Choksi et al. | 137/510 |

FOREIGN PATENT DOCUMENTS 1921541 10/1970 Fed. Rep. of Germany .... 200/83 Q
2750419 11/1977 Fed. Rep. of Germany .

Primary Examiner—Gerald P. Tolin
Attorney, Agent, or Firm—Ladas & Parry

[57] ABSTRACT

A fluid switch for measuring throughput in a fluid line, the fluid switch having an electrical switch and an associated membrane subjected to the pressure of the fluid introduced into a working chamber of the fluid switch. The fluid pressure causes simultaneous opening of a fluid outlet of the fluid switch and of contacts of the electrical switch. Thereby, the number of openings and closings of the switch will be representative of the number of openings of the fluid outlet and the throughput of the fluid. The membrane carries a projection serving as a valve which cooperates with a valve seat on the fluid outlet and the valve is coupled through a tappet to the electrical switch to open the switch when the valve is lifted off the valve seat.

11 Claims, 1 Drawing Sheet

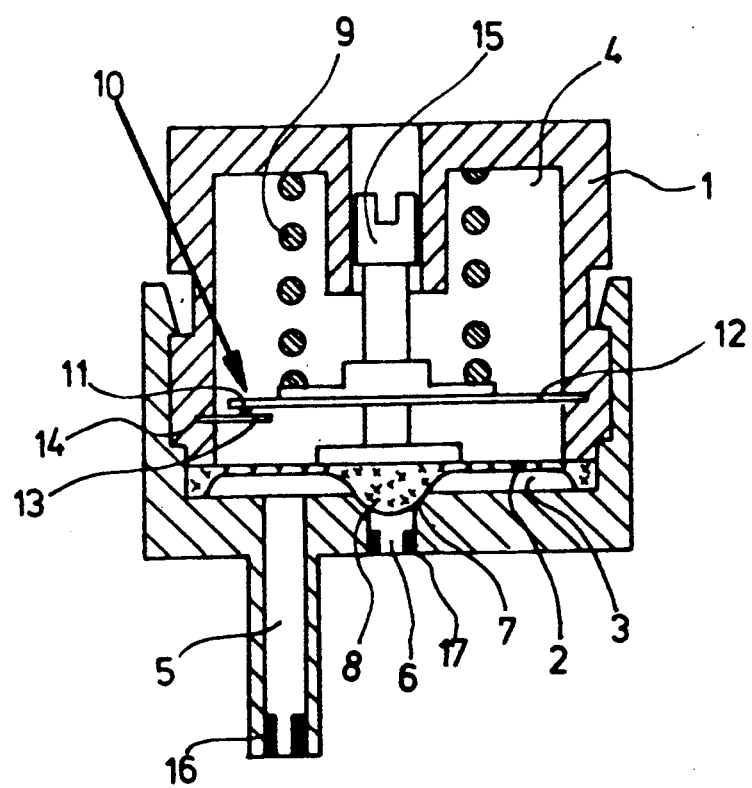

FLUID PRESSURE SWITCH ADAPTED FOR LOW FLUID PRESSURE AND THROUGHPUTS

FIELD OF THE INVENTION

The invention relates to a fluid pressure switch responsive to throughput and pressures of a fluid and particularly to low pressures and small throughputs.

BACKGROUND

Fluid pressure switches are used for internal-combustion engines, for example, in a lubricating oil circuit to electrically indicate working pressure. However other applications are possible in which fluid throughput can be determined from the measured working pressure and the known parameters of a choke. These conventional switches are suitable for precise measurements based on very high fluid pressures but are not capable of measurement of small throughput values at low pressures.

SUMMARY OF THE INVENTION

An object of the invention is to provide a fluid pressure switch in which flow-through measurements are possible for very low throughput quantities.

According to the invention, the fluid pressure switch comprises a valve portion which controls fluid flow through the switch and an electrical switch means which produces an output signal representative of the fluid flow through the switch.

According to one embodiment of the invention, the fluid pressure switch comprises a flexible membrane mounted in a housing and dividing the housing into first and second chambers, the first chamber having a fluid inlet and a fluid outlet whose communication is controlled by a valve means operatively coupled to the membrane. The valve means is constructed to open and close the fluid outlet, depending on fluid pressure in the first chamber and deformation of the membrane resulting from said fluid pressure. An electrical switch means is disposed in the second chamber and has opened and closed states and a spring means urges the electrical switch means to one of its states. Operatively coupled to the membrane is a means for changing the state of the switch means from said one state to the other state upon deformation of the membrane and opening of the fluid outlet.

The invention contemplates that the valve means can be in the form of a projection o the membrane which faces a seat of the fluid outlet. The projection can be integral with the membrane.

The electrical switch means is closed in said one state and the means which urges the switch means to the closed state comprises a spring.

The electrical switch means can be in the form of a flexible leaf element carrying a first electrical contact which faces a second electrical contact on a fixed element. The spring acts on the flexible leaf element to bring the contacts into electrical contact with one another.

A membrane tappet can be fixed to the flexible leaf element so that the spring can bear against the tappet and thereby apply force to the flexible leaf element and to the membrane.

In a particular embodiment, the flexible leaf element has one end fixed to the housing and a free end carrying the electrical contact thereof, the spring acting on the flexible leaf element between the ends thereof.

Flow control chokes can be provided in the fluid inlet and the fluid outlet.

BRIEF DESCRIPTION OF THE FIGURE OF THE DRAWING

The sole figure of the drawing is a diagramatic illustration in cross-section of a fluid switch according to the invention.

DETAILED DESCRIPTION OF A PREFERRED EMBODIMENT

In the drawing there is shown a pressure switch according to the invention which includes a switch housing 1 divided by a flexible membrane 2 into a working chamber 3 and a switch chamber 4. The working chamber 3 is connected by a fluid inlet 5 to a fluid pressure line (not shown) and by a fluid outlet 6 to a fluid outlet line (not shown). The outlet 6 has a valve seat 7.

Membrane 2 carries a valve means in the form of an integral projection 8, which faces valve seat 7 and is pressed against the latter by a spring 9 disposed in the switch chamber 4. An electrical switch 10 is mounted in switch chamber 4 and is formed by a contact 11 carried on a leaf spring 12 and a contact 13 carried on a fixed contact element 14 secured to the housing. Leaf spring 12 carries a membrane tappet 15 which receives the force of spring 9 and bears against the membrane 2 at projection 8, so that at a sufficiently high fluid pressure in chamber 3, the force of spring 9 and leaf spring 12 are overcome and switch contacts 11, 13 are opened, whereas at lower pressures the switch contacts remain closed.

Leaf spring 12 and contact element 14 are insulated electrically with respect to each other and are connected electrically to an evaluating circuit (not shown). Inlet 5 can be provided with a choke 16, whose function will be described later.

The switch according to the invention is adapted for connection in a fluid line having small throughput quantities, for example, for introducing an additive into a fuel tank.

For example, the addition to the fuel of an additive which has a catalytic effect, can be effected for limiting the smoke exhaust of diesel engines. The addition of the additive is effected in an amount representing a specific ratio relative to the quantity of fuel which is introduced into the tank. The additive is supplied by an electrical pump in an amount based on a level-indicator signal or level-change signal. The pump delivers the fluid into fluid inlet 5 under pressure which acts against membrane 2. Membrane 2 elastically deforms into switch chamber 4 when the pressure acting on membrane 2 is sufficient to overcome the forces of spring 9 and leaf spring 12. Thereupon, the projection 8 is lifted off valve seat 7 and switch contacts 11, 13 are simultaneously opened. Upon opening of outlet 6, the fluid pressure drops in proportion to the quantity of fluid flowing through outlet 6 into the fluid line leading to the fuel tank, whereby membrane 2 is restored to its initial position by the spring forces and valve seat 7 is closed by projection 8. Leaf spring 12 is also relieved of the fluid pressure applied through tappet 15 so that contacts 11 and 13 close. This process is repeated continually during the pump delivery. Since with each valve opening, contacts 11, 13 are opened simultaneously, the flow-through quantity can be determined by the number of switching states of the switch, i.e. by the number of open and closed states of the switch.

The switch, according to the invention, is suitable for the measurement of minimal flow-through quantities, since any desired flow-through characteristic can be achieved by adapting the membrane surface and the spring forces, for example, by providing a low switching frequency with large flow-through quantities or vice versa. In addition, the characteristic can be influenced by the choke 16 of inlet 5 or a choke 17 in outlet 6. In the normal case, however, large line cross sections are provided, which produce a low sensitivity to contamination and also permit a delivery of highly viscous fluids, for example, at low temperatures.

A great advantage is provided by the diagnostic capacity of the switch of the invention. For testing functional capacity, previously only the fluid passing through the electrical pump was evaluated; it can not be established whether this flow-through had actually occurred.

In the switch of the invention, a flow-through signal is present which, for example, can be connected to an electronic control means and can be converted to a control signal for the electrical pump, so that an accurate addition of the additive to the fuel can be obtained.

The electrical switch means may be comprised, for example, as a proximity switch operating without contacts, such as capacitor, inductor or magneto-resistive switches.

Although the invention has been described in relation to a specific preferred embodiment thereof, it will become apparent to those skilled in the art that numerous modifications and variations can be made within the spirit and scope of the invention as defined in the attached claims

What is claimed is:

1. A switch responsive to the throughput and pressure of a fluid comprising a housing, a flexible membrane in said housing dividing the housing into first and second chambers, a fluid inlet in the first chamber, a fluid outlet in the first chamber, valve means operatively coupled to said membrane for opening and closing said fluid outlet depending on fluid pressure in said first chamber and on deformation of said membrane resulting from said fluid pressure, electrical switch means in said second chamber having open and closed states, means urging said electrical switch means to one of said states, said means being operatively coupled to said membrane for changing the state of said switch means to the other state thereof upon deformation of said membrane and opening of said fluid outlet.

2. A switch as claimed in claim 1 wherein said valve means comprises a projection on said membrane facing a seat of said fluid outlet.

3. A switch as claimed in claim 2 wherein said projection is integral with said membrane.

4. A switch as claimed in claim 1 wherein said electrical switch means in said one state is closed and said means urging said switch means to the closed state comprises a spring means.

5. A switch as claimed in claim 4 wherein said electrical switch means comprises a flexible leaf element carrying a first electrical contact and a fixed element carrying a second electrical contact facing said first electrical contact, said spring means acting on said flexible leaf element.

6. A switch as claimed in claim 5 wherein said means for uring said electrical switch means to closed state further comprises a tappet fixed to said flexible leaf element, said spring means bearing against said tappet.

7. A switch as claimed in claim 5 wherein said flexible leaf element has one end fixed in said housing and an opposite free end at which said second electrical contact is carried.

8. A switch as claimed in claim 7 wherein said spring means acts on said flexible leaf element between said ends thereof.

9. A switch as claimed in claim 1 comprising a choke in said fluid inlet.

10. A switch as claimed in claim 1 comprising a choke in said fluid outlet.

11. A switch as claimed in claim 6 wherein said tappet includes a portion bearing against said membrane.

* * * * *